(12) United States Patent
Garvin et al.

(10) Patent No.: US 8,635,631 B2
(45) Date of Patent: Jan. 21, 2014

(54) SYSTEM AND METHOD FOR CONSOLIDATED INFORMATION HANDLING SYSTEM COMPONENT DRIVERS

(75) Inventors: Christian Garvin, Round Rock, TX (US); Troy Tiritilli, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 13/434,141

(22) Filed: Mar. 29, 2012

(65) Prior Publication Data

US 2012/0185878 A1 Jul. 19, 2012

Related U.S. Application Data

(62) Division of application No. 11/877,721, filed on Oct. 24, 2007, now Pat. No. 8,166,490.

(51) Int. Cl.
*G06F 9/44* (2006.01)
*G06F 9/445* (2006.01)

(52) U.S. Cl.
USPC .............................. 719/321; 717/174; 717/175

(58) Field of Classification Search
None
See application file for complete search history.

(56) References Cited

U.S. PATENT DOCUMENTS

| | | | |
|---|---|---|---|
| 6,167,567 A | 12/2000 | Chiles et al. | |
| 6,278,759 B1 | 8/2001 | Yoon et al. | |
| 6,340,997 B1 | 1/2002 | Borseth | |
| 6,429,793 B1 | 8/2002 | Paolini | |
| 7,111,322 B2 * | 9/2006 | Slick et al. | 726/5 |
| 7,313,514 B2 | 12/2007 | Rose et al. | |
| 7,484,245 B1 * | 1/2009 | Friedman et al. | 726/27 |
| 7,496,931 B2 * | 2/2009 | Cook et al. | 719/327 |
| 7,536,558 B2 | 5/2009 | Neble et al. | |
| 7,584,353 B2 | 9/2009 | Risan et al. | |
| 7,620,956 B2 * | 11/2009 | Cook et al. | 719/313 |
| 7,640,554 B2 | 12/2009 | Yamade | |
| 7,870,385 B2 | 1/2011 | Risan et al. | |
| 8,151,280 B2 * | 4/2012 | Sather et al. | 719/321 |
| 2002/0010806 A1 * | 1/2002 | Yamade | 709/327 |
| 2002/0120576 A1 | 8/2002 | Yamada et al. | |
| 2004/0067045 A1 | 4/2004 | Kuroda et al. | |
| 2004/0109568 A1 * | 6/2004 | Slick et al. | 380/277 |
| 2005/0136909 A1 | 6/2005 | Eguchi | |

\* cited by examiner

*Primary Examiner* — Van Nguyen
(74) *Attorney, Agent, or Firm* — Terrile, Cannatti, Chambers & Holland, LLP; Robert W. Holland

(57) ABSTRACT

An information handling system which includes plural processing components operable to process information wherein at least one processing component has plural region-specific modes of operation, a driver package associated with the at least one processing component wherein the driver package has plural region-specific drivers, and an encrypted key stored on a processing component wherein the encrypted key designates one of the plural region-specific drivers to manage the processing component.

10 Claims, 4 Drawing Sheets

SYSTEM AND METHOD FOR CONSOLIDATED INFORMATION HANDLING SYSTEM COMPONENT DRIVERS

CROSS-REFERENCE TO RELATED APPLICATIONS

This application is a divisional of application Ser. No. 11/877,721, filed Oct. 24, 2007, now U.S. Pat. No. 8,166,490, issued Apr. 24, 2012, entitled "System And Method For Consolidated Information Handling System Component Drivers," naming Christian Garvin and Troy Tiritilli as inventors, and which is hereby incorporated by reference in its entirety.

BACKGROUND OF THE INVENTION

1. Field of the Invention

The present invention relates in general to the field of information handling system component drivers, and more particularly to a system and method for consolidated information handling system component drivers.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are typically built from a variety of hardware components that are manufactured by a variety of companies. Generally, the hardware components cooperate to process information under the direction of an operating system, such as WINDOWS. In order to easily adapt to the wide variety of available components, operating systems often load drivers prepared by the manufacturers of the components. The drivers define operations performed by the components and communications between the components and the operating system. Some examples of components that use drivers include printers, displays, storage devices, and networking devices including wireless local area network (WLAN) devices. Information handling systems are typically manufactured to include an operating system that is preconfigured with drivers to support hardware components included in the systems. For example, as an information handling system is built to include specific hardware components, drivers associated with the components are included in an operating system image that is copied to the hard disk drive of the information handling system. When an end user powers up the information handling system, the operating system has the drivers that it needs to ensure proper operation of the included components.

One difficulty with preparing an image for use on an information handling system is identification of the components used in the system and their associated drivers. Tracking the use of multiple drivers for multiple types of components can present a significant challenge. The challenge is sometimes increased where the operation of certain components depends upon government regulations for the component. For example, regulatory requirements for WLAN devices, such as 802.11 devices, require country specific behaviors and channel support. Each specific behavior and channel support typically requires a specialized driver and, sometimes, country specific hardware. An example, the United States and Japan each have their own WLAN requirements and each will not allow a switch or selector that allows and end user to select a specific region, although any number of countries or regions may set their own requirements. By comparison, most other countries will allow region selection with a switch or selector. Thus, information handling system manufacturers typically must support each region with a unique driver for each WLAN component. This entails a region specific update capability to aid users with installation or reinstallation of a driver and testing of each WLAN component with each driver.

SUMMARY OF THE INVENTION

Therefore a need has arisen for a system and method which provides a single driver for an information handling system component having multiple regional regulatory requirements.

In accordance with the present invention, a system and method are provided which substantially reduce the disadvantages and problems associated with previous methods and systems for support multiple drivers of an information handling system component. A driver package having plural region specific drivers for a component is loaded onto an information handling system. A region specific driver is selected from the package based on one or more predetermined factors and is activated in the operating system. An encrypted key establishes the region for the driver to prevent unauthorized use of other region specific drivers by the information handling system.

More specifically, at manufacture of an information handling system, a driver package having plural region-specific drivers is loaded to the information handling system, such as to support operation of a wireless LAN adapter. Initial configuration of the information handling system to a selected of the plural region-specific drivers is commanded and an encrypted registry key is placed in the operating system of the information handling system. A manager associated with the driver package monitors subsequent operations at the information handling system to ensure that an unauthorized region-specific driver is not used at the information handling system. During a subsequent attempt to install a region-specific driver, such as with an update, the manager compares the registry key to the update to ensure compatibility. If a registry key is not set on the information handling system, an installer of the driver package generates a registry key based on a region specified in configuration information of the information handling system or a region code of the operating system. The manager maintains the registry code to prevent changes to the region specific driver until the component is removed from the information handling system.

The present invention provides a number of important technical advantages. One example of an important technical advantage is that plural regulatory requirements for an information handling system component are met with a single driver package. Selection by an installer of a driver from the driver package is performed on the basis of the region associated with the information handling system so that regional requirements for the component associated with the driver are met. An encrypted registry key that defines the driver region remains on the information handling system to ensure that the region is not changed unless the component is removed from the information handling system. As an example, a WLAN component has a driver that supports plural regions for simplified installation of the component, however, the region installed on the information handling system remains non-selectable as required by the regulations of the region.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A driver package having plural region-specific drivers improves efficiency in managing information handling system manufacture while complying with region-specific regulatory constraints. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
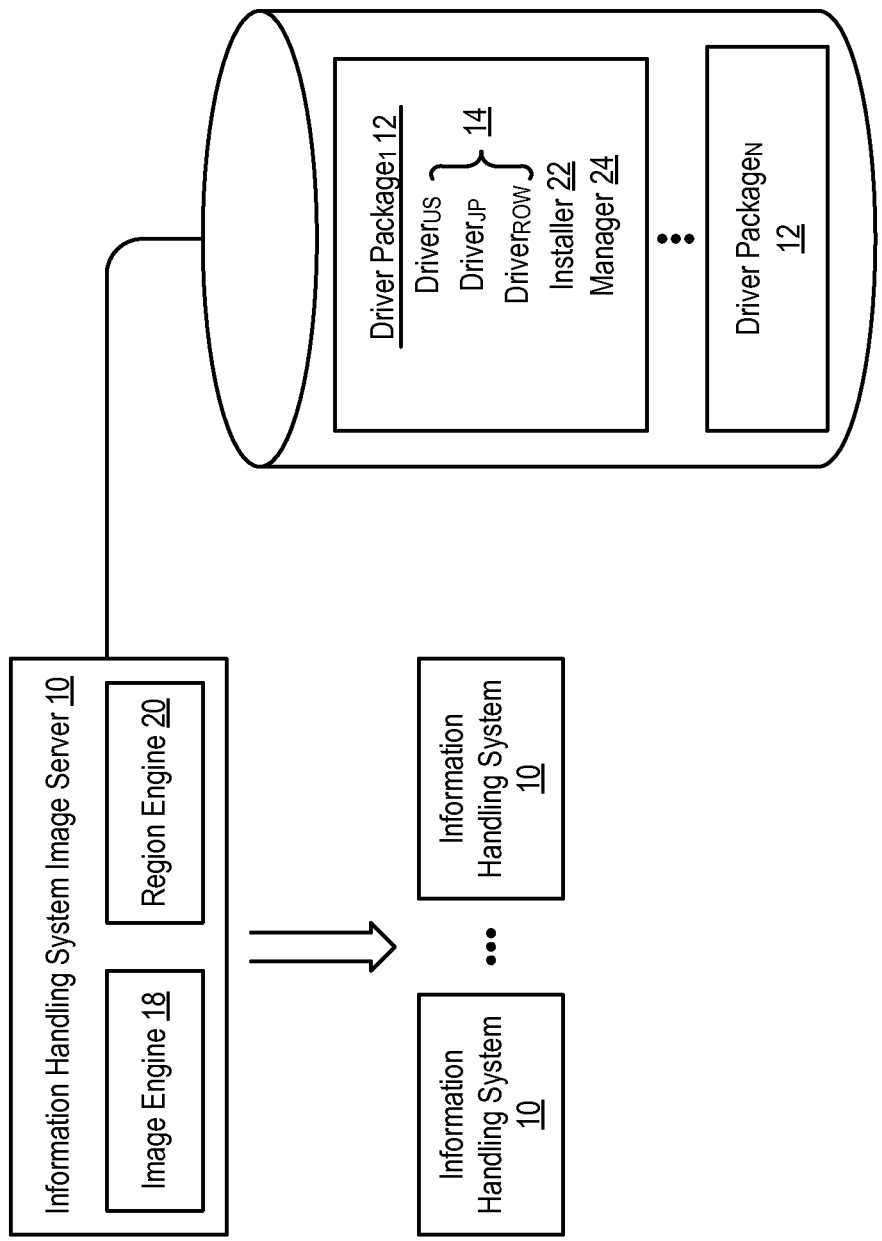
FIG. 1 depicts a block diagram of a system for manufacture of information handling systems with driver packages having multiple region-specific drivers.

Referring now to FIG. 1, a block diagram depicts a system for manufacture of information handling systems 10 with driver packages 12 having multiple region specific drivers 14. An information handling system image server 16 interfaces with the information handling systems 10 during manufacture to copy a desired image, such as an operating system and applications. An image engine 18 copies the image to each information handling system 10 based on a manufacturing manifest that defines the configuration for each information handling system 10. A region engine 20 determines a region for each information handling system 10, such as by reference to a shipping address of the manifest, and determines a region-specific driver for one or more of the components of the information handling system 10. Once image engine 18 generates an image with a driver package 12 for the component, region engine 20 provides a command line to activate the selected region-specific driver 14 based on the determined region. An installer 22 of the driver package 12 runs on the information handling system to load the selected region-specific driver 14 so that only that driver 14 will run on the information handling system 10. For example, installer 22 activates the region specific driver 14 with an encrypted operating system registry key. A manager 24 decrypts the key for authorized use of the driver, such as to perform system updates.

Figure 2:
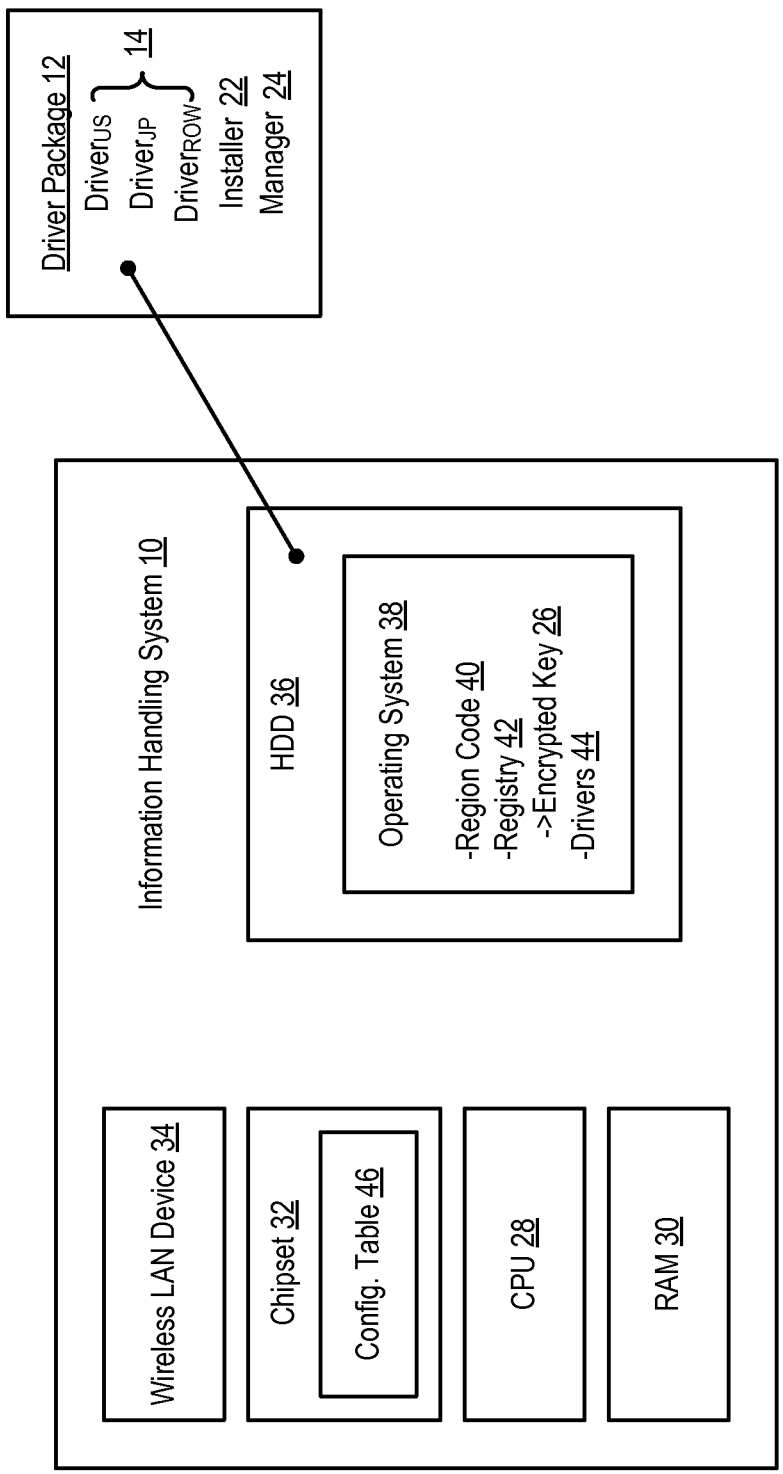
FIG. 2 depicts a block diagram of an information handling system with a region-specific driver managed by an encrypted key.

Referring now to FIG. 2, a block diagram depicts an information handling system 10 with a region-specific driver 14 managed by an encrypted key 26. Information handling system 10 has plural processing components, such as a CPU 28, RAM 30, a chipset 32, a wireless LAN device 34 and a hard disk drive 36, that process information under the coordination of an operating system 38. Operating system 38 includes a region code 40 that specifies the region in which the information handling system operates, a registry that maintains registry keys for hardware and software of the information handling system, and drivers 44 that run to support communication with hardware components of the information handling system. Additional configuration information 46 is stored in firmware to be available at boot of information handling system 10. For example, at power-up information handling system 10 boots with firmware instructions from chipset 32 to bring operating system 38 on line. Operating system 38 establishes communication with wireless LAN device 34 using a region-specific driver 14 so that the wireless signals sent by wireless LAN device 34 comply with the region in which information handling system 10 is located.

The region-specific driver is set by encrypted key 26. Manager 24 maintains encrypted key 26 as long as wireless LAN device 34 remains in information handling system 10 so that an end user cannot select a different region-specific driver 14. Thus, for instance, an information handling system sold in the United States will use a driver authorized for the United States and not selectable by the end user, as is required by United States regulations. Similarly, an information handling system sold in Japan will use a driver authorized for Japan and not selectable by the end user, as is required by Japan regulations. A more generic "rest of the world" (ROW) driver is available for systems in regions outside of the United States and Japan. Manager 24 decrypts encrypted key 26 when access is needed to the driver, such as for authorized use or updates. Manager 24 prevents configuration of wireless LAN device 34 with a different driver unless authorized.

Figure 3A:
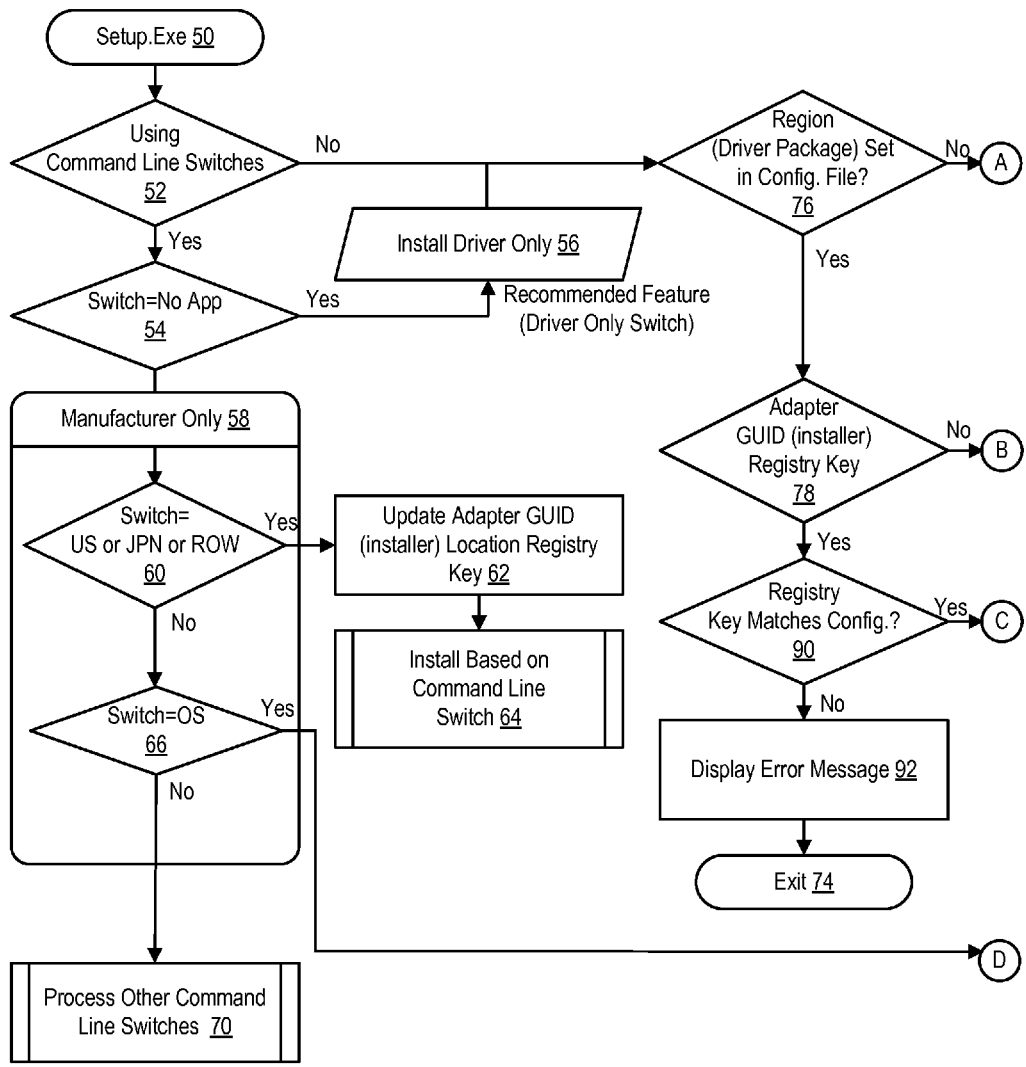
FIG. 3 depicts a flow diagram of a process for managing installation and maintenance of a region-specific driver.
Figure 3B:
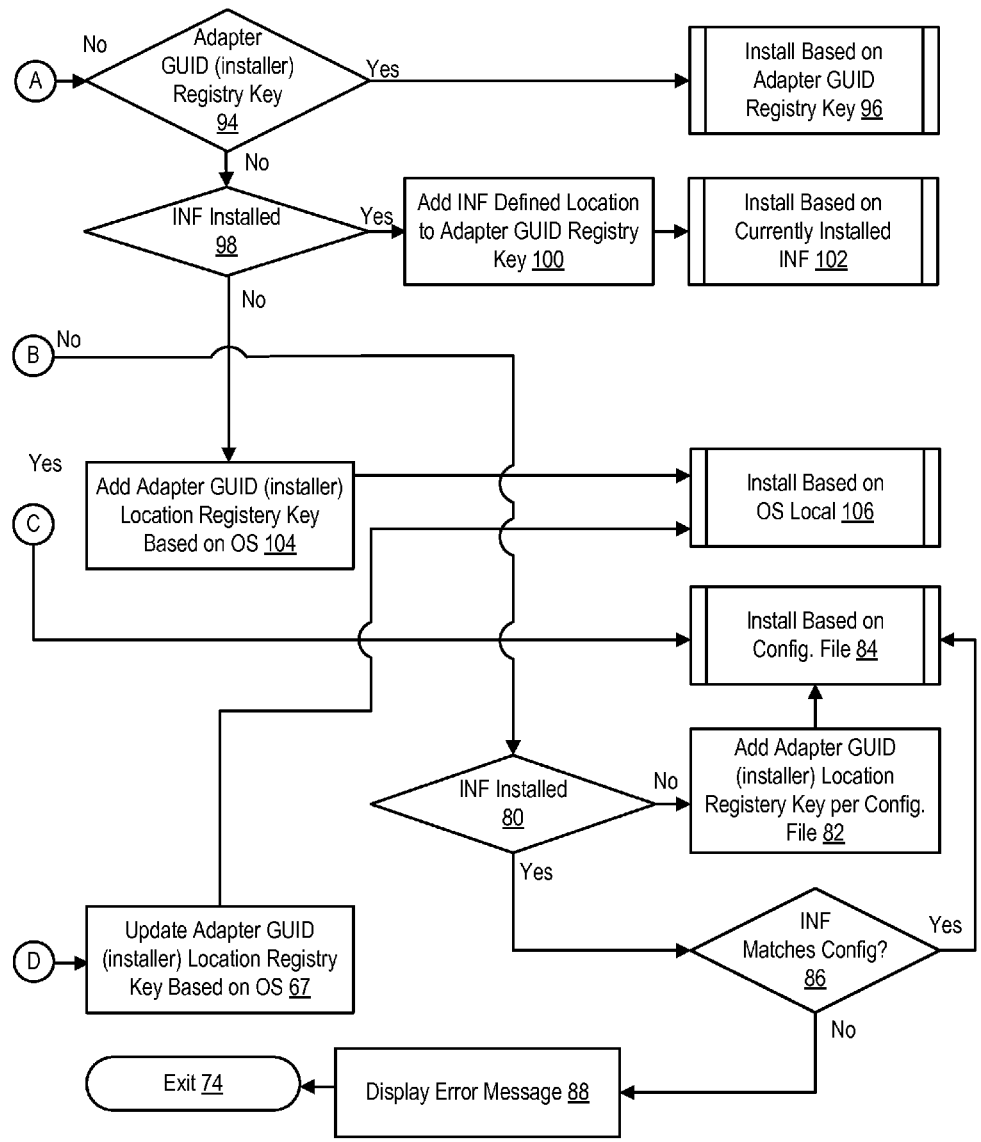

Referring now to FIG. 3, a flow diagram depicts a process for managing installation and maintenance of a region-specific driver. The process begins at step 50 with execution of a region-specific driver setup installation application. At step 52, a determination is made of whether the setup is using command line switches, such as at manufacture of the information handling system. If a command line switch is recognized, the process continues to step 54 to determine if the installation includes an application. If no application is installed, the process continues to step 56 to perform a driver only installation based on region information discovered from the information handling system. If the switch indicates installation of an application, the process continues to step 58 for commands limited to performance by an information handling system manufacturer. At step 60, a determination is made of whether the command line switch indicates a specific region, such as the United States, Japan or ROW, and, if so, the process continues to step 62. At step 62, the operating system registry is updated with an encrypted GUID registry key and, at step 64, the region-specific driver is installed. If at step 60 a region-specific command line is not found, the process continues to step 66 to determine if a command line specifies installation based on a region identified by the operating system. If so, the process continues to install based on the operating system region as set forth below after updating the wireless adapter GUID region registry key in the operating system. If at step 66, the command line switch does not specify installation based on the operating system region, the process continues to step 70 to process other remaining command line switches.

If at step 52 a determination is made that a command line switch is not used, the process continues to step 76 to determine if the region of the driver package is set in a configuration file of the information handling system. If so, the process continues to step 78 to determine if a prior installation was performed by checking for the wireless adapter GUID installer registry key in the operating system. If no registry key is found, the process continues to step 80 to determine if a driver is installed. If a driver is not installed, the process continues to step 82 to add the adapter GUID region registry key per the region defined by the configuration file and the process continues to step 84 to install the region-specific driver based on the configuration information. If at step 78 the GUID registry key is found, the process continues to step 90 to determine that the key matches the region of the configuration information and, if a match is found, installs the region-specific driver at step 84. If at step 90 the registry key does not match, the process continues to step 92 to display an error message and exits at step 74.

If at step 76, a region is not specified in the configuration file, the process continues to step 94 to determine if a wireless adapter GUID registry key is set in the operating system and, if so, the driver is installed at step 96 based on the region associated with the encrypted registry key. If at step 94 the adapter region registry key is not installed, the process continues to step 98 to determine if a driver is installed on the information handling system. If so, the process continues to step 100 to add the region registry key defined by the driver and then to step 102 to perform an install function based on the region associated with the currently installed driver's region. If at step 98 a driver is not currently installed, the process continues to step 104 to add the wireless adapter GUID region registry key based on the region set in the operating system of the information handling system. At step 106, the driver is installed based on the region associated with the operating system.

Although the present invention has been described in detail, it should be understood that various changes, substitutions and alterations can be made hereto without departing from the spirit and scope of the invention as defined by the appended claims.

What is claimed is:

1. An information handling system comprising:
    plural processing components that process information, at least one processing component having plural region-specific modes of operation;
    a driver package stored in memory and associated with the at least one processing component, the driver package having plural region-specific drivers;
    an encrypted key stored in the memory and designating one of the plural region-specific drivers to manage the at least one processing component; and
    a driver management module that runs on at least one of the processing components to decrypt the encrypted key, identifies one of the region-specific drivers from the encrypted key, and allows actions for the at least one processing component with only the identified region-specific driver,
    wherein the driver management module limits actions for region-specific drivers not associated with the encrypted key.

2. The information handling system of claim 1 wherein the at least one processing component comprises a wireless networking component.

3. The information handling system of claim 2 wherein the plural region-specific drivers comprise a driver for the United States and a driver for Japan.

4. The information handling system of claim 1 wherein the encrypted key comprises an encrypted operating system registry key.

5. The information handling system of claim 1 further comprising an installer module associated with the driver package, the installer module applies a predetermined factor to determine a region-specific driver and to set the encrypted key for the region specific driver.

6. The information handling system of claim 5 wherein the predetermined factor comprises an operating system location setting.

7. The information handling system of claim 5 wherein the predetermined factor comprises a key already stored on the information handling system.

8. An information handling system comprising:
    plural components that cooperate to process information;
    a driver package stored in memory, the driver package having plural region specific drivers, each of the plural region specific drivers execute on one or more of the plural components to manage a predetermined of the plural components for operation in a predetermined of plural regions;
    an encrypted registry key stored in the memory and defining one of the plural regions; and
    a driver management module that decrypts the encrypted registry key to identify a region-specific driver associated with the encrypted registry key and allows actions at the predetermined component for the identified region-specific driver,
    wherein the driver management module further limits actions for region-specific drivers not associated with the encrypted registry key.

9. The information handling system of claim 8 wherein the component one or more of the plural components comprises a wireless networking component.

10. The information handling system of claim 9 wherein the plural region-specific drivers comprise a driver for the United States and a driver for Japan.

* * * * *